Figure 4:
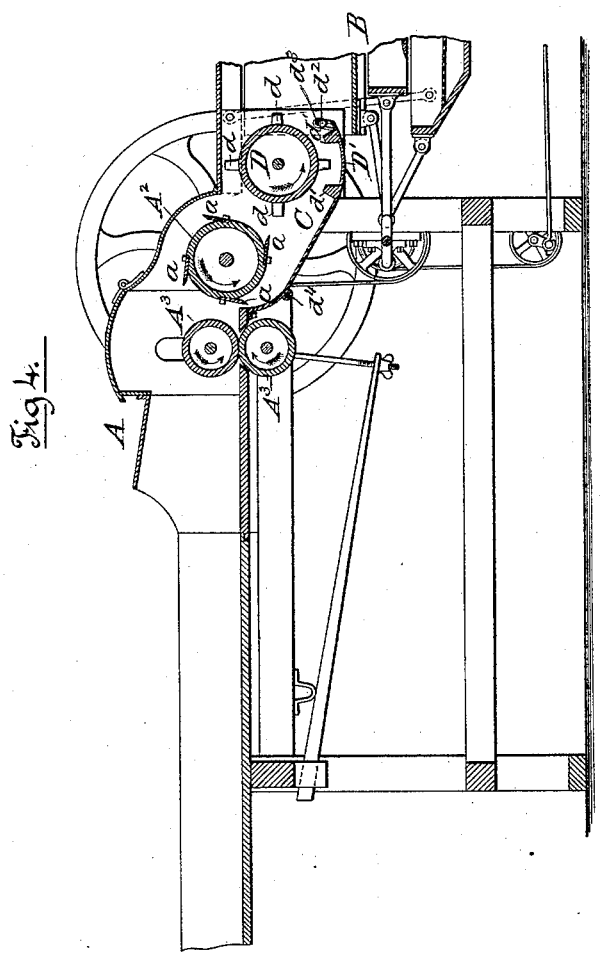

(No Model.) 2 Sheets—Sheet 1.
P. HOBLER & A. S. PECK.
MACHINE FOR CUTTING AND SHELLING CORN.
No. 465,134. Patented Dec. 15, 1891.
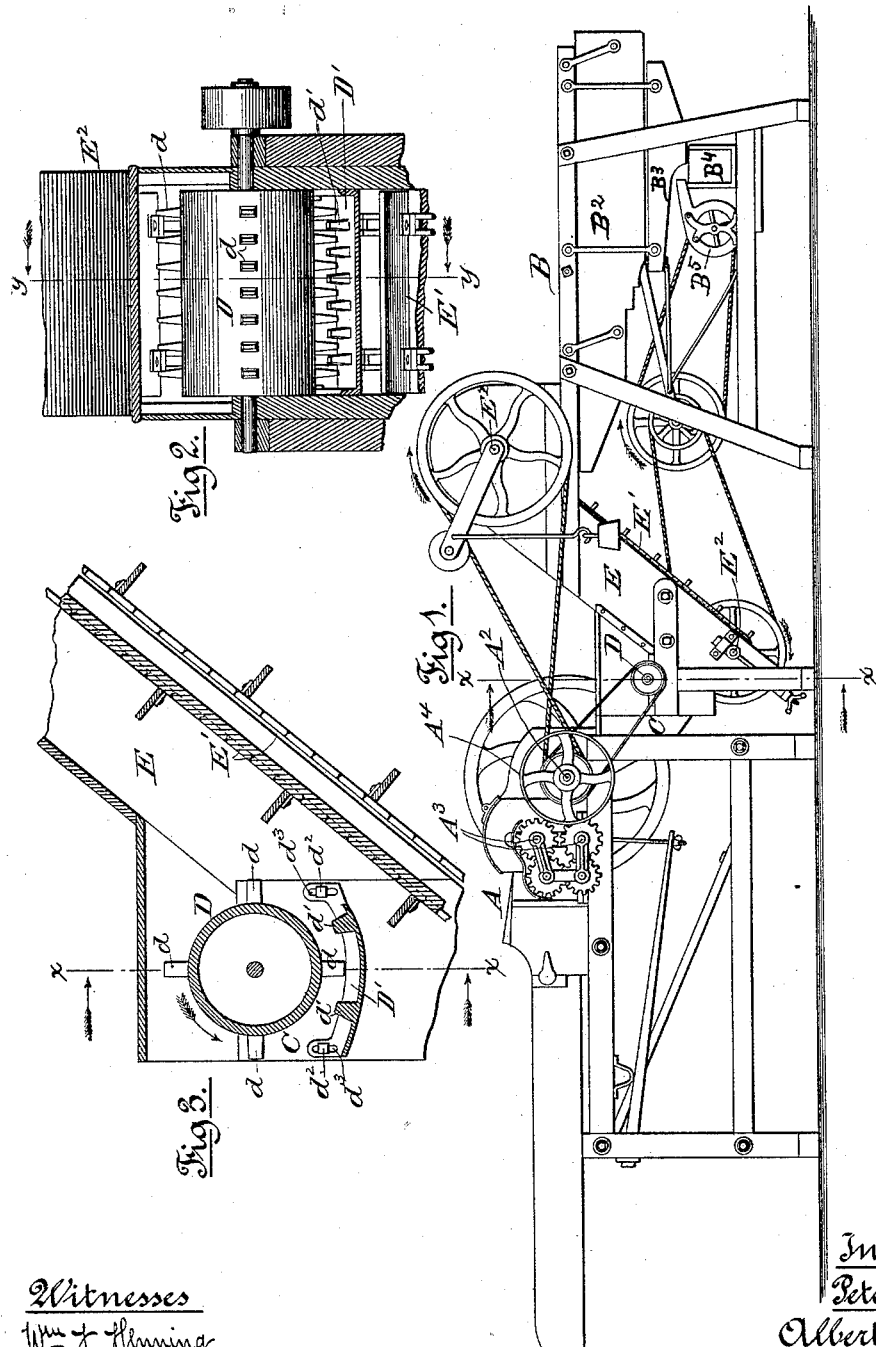
Witnesses
Wm. F. Henning
Louis M. Whitehead
Inventors
Peter Hobler
Albert S. Peck.
by Dayton, Poole & Brown
Attorneys.

(No Model.) 2 Sheets—Sheet 2.

P. HOBLER & A. S. PECK.
MACHINE FOR CUTTING AND SHELLING CORN.

No. 465,134. Patented Dec. 15, 1891.

Witnesses.
Wm. J. Henning.
Louis M. Whitehead.

Inventors
Peter Hobler
Albert S. Peck.
by Dayton, Poole & Brown
Attorneys.

UNITED STATES PATENT OFFICE.

PETER HOBLER, OF BATAVIA, AND ALBERT S. PECK, OF GENEVA, ILLINOIS.

MACHINE FOR CUTTING AND SHELLING CORN.

SPECIFICATION forming part of Letters Patent No. 465,134, dated December 15, 1891.

Application filed November 12, 1888. Serial No. 290,532. (No model.)

*To all whom it may concern:*

Be it known that we, PETER HOBLER, of Batavia, and ALBERT S. PECK, of Geneva, in the county of Kane and State of Illinois, have invented certain new and useful Improvements in Combined Machines for Cutting and Shelling Corn or Cutting and Shelling Cereal Grains; and we do hereby declare that the following is a full, clear, and exact description thereof, reference being had to the accompanying drawings and to the letters of reference marked thereon, which form a part of this specification.

This invention relates to machinery the purpose of which is, at a single operation, to cut and shell corn on the cob and stalk and to cut and thrash cereal grains.

In a patent to Sextus P. Goddard, dated December 18, 1883, and numbered 290,571, now owned by us, is shown and described a machine for cutting corn in the cob and stalk and separating the kernels from the cut cobs and stalks. This Goddard machine embraces a cutter, generally of the kind ordinarily employed for cutting straw, hay, &c., a sifting or separating device, and a pair of spike-armed cylinders arranged one above the other and rotating in the same direction at their adjacent surfaces. In this construction the stalks and ears of corn are first acted upon by the cutter, next by the spike-armed cylinders, and finally the kernels are separated from the cut cobs and stalks by the sifting or separating apparatus. In order to effect a satisfactory shelling of the corn from the cob by this machine, it is necessary that the cutting mechanism be run at a very high speed, the cobs and stalks being thereby cut into very short lengths before being acted upon by the armed cylinders. It is not practicable to cut and to thrash satisfactorily cereal grains by this machine from the fact that the short lengths of straw are about the same length as the kernels of grain and almost as heavy, which renders the separation of the kernels of grain from the cut straw very difficult.

The object of the present invention is primarily to provide a construction in such machines as will insure the more complete shelling of corn thus cut and partially shelled in the cutting by a lower speed of the cutters, and also to provide a machine which may be used to cut and thrash cereal grains at a single operation in accordance with the method invented by one of us—namely, Peter Hobler—and set forth in another application for patent filed of even date herewith.

In the accompanying drawings, Figure 1 is a side elevation of a combined machine embodying our joint invention. Fig. 2 is a fragmentary vertical transverse section in the line $x\ x$ of Figs 1 and 3. Fig. 3 is a fragmentary vertical longitudinal section in the line $y\ y$ of Fig. 2. Fig. 4 is a central vertical longitudinal section of the material parts, showing certain modifications.

A represents a feed-cutter, of which A' is the bed, $A^2$ a cylindrical cutter armed with knives $a\ a$, and $A^3\ A^3$ feed-rollers for feeding the stuff to the cutter.

B is a separator of any desired construction.

C is a chute or passage for conducting the cut material that falls from the cutter $A^2$ to the separator or away from the cutter. In this passage is located a thrashing mechanism consisting, as here shown, of a rapidly-rotating cylinder D, armed upon its periphery with spikes or teeth $d\ d$, and having a motion away from the cutter on its under side.

Below the thrashing-cylinder D is arranged a concave or plate D', provided with upwardly-projecting teeth $d'$, arranged in position to allow the teeth $d$ on the cylinder to pass between them. As a special improvement, the plate D' is shown attached to the side walls of the passage C by means of bolts $d^2$, which pass through slots $d^3$ in the upturned marginal flange at each end of the plate D'. By means of this or some equivalent device the plate D' may be adjusted vertically, so that the spikes $d$ on the cylinder will more or less nearly proximate the plate. In Fig. 3 of the drawings the plate D' is sustained wholly by such adjusting-bolts, one at each end of the flange; but in Fig. 4 the plate D' is shown extended, as a part of the chute, to a point $d^4$ beneath or near the cutter, where it is hinged to an upper section of the chute. In this construction the adjustment of the plate D' is effected by rotation of the plate and its connected part of the chute upon the axis $d^4$ and the plate is secured in its properly-adjusted position by the bolts $d^2$, one at each end of the plate or side of the machine.

Other of many well-known adjusting devices may be employed in place of those here shown without departure from the invention.

The advantage of employing the thrashing-cylinder is, as above set forth, twofold: First, the performance of the shelling of corn from the cob more perfectly and with less power, and second, that of giving to the machine the new capacity of thrashing cereal grains the straw or stalks of which have been cut by the cutter on their way to the thrashing devices. In attaining the first of these advantages the machine, provided with the spike-armed cylinder and plate, operates somewhat differently from the Goddard machine, wherein the shelling of the corn from the cob is accomplished exclusively, or practically so, by the cutter. To do the latter it is necessary that the cob be cut into short sections in order that the cutters may operate to loosen or detach the kernels from the cob. In the machine as here improved the cobs and stalks will be cut into pieces of greater length and the shelling will be only in part accomplished by the cutters, and for the rest will be performed by the spike-armed cylinder and concave. The cobs and stalk thus cut to greater lengths (say an inch and a half to two inches in length, as against a quarter to a half of an inch produced by the former construction) allows the cutting part of the machine to be run at a lower rate of speed, while giving to it the same or a greater capacity or yield. The less reduced cobs will be only partially stripped of corn and sometimes unbroken or broken only into large fragments lengthwise of the cob; but when these large fragments reach the cylinder and concave they are still further broken up, and the work of shelling is completed. The stalks of this greater length are also bruised by the action of the spike-armed cylinder and concave, and are delivered in better form and condition for feed than when cut to the shorter length given them by the old machine. The gain in reduction of speed and power is a matter of considerable moment in this class of machines, for the reason that farmers are more commonly able to supply the power called for by the reduced speed of the new machine than that called for by the higher speed necessary for a satisfactory action in the older machine.

By the introduction of the thrashing devices herein provided, in place of the spike-armed cylinders of the Goddard machine, it is found that by both the cutters and the said thrashing devices the kernels of cereal grains are thrashed out with practical completeness, giving the cut straw in lengths best adapted for feed.

In Fig. 1 the machine is shown provided with an elevator E, forming an extension of the passage from the cutter to the separator, and arranged in any suitable manner to take the material as it leaves the thrashing or beating device. The elevator, as shown, comprises an endless belt E', provided with transverse cleats or buckets $e$ and trained over suitable shafts or drums $E^2$; but any other form of elevator or conveyer may be employed in place of that shown, if one is desired at all. In Fig. 4 the elevator is omitted, and the uppermost screen B' of the separating devices is placed low enough to allow the thrasher (somewhat more elevated than in Fig. 1) to deliver directly thereon.

As illustrated in the drawings, the separator comprises a shoe $B^2$, provided with one or more screens into which the material is delivered after it has been acted on by the thrashing-cylinder, a second shoe $B^3$ below the shoe $B^2$, also provided with one or more screens, a receptacle $B^4$ for the shelled grain located below the discharge of the shoe $B^3$, and a fan-blower $B^5$, located in advance of the receptacle and arranged to deliver an air-blast between the receptacle $B^4$ and the discharge of the shoe $B^3$.

Peculiarities in the construction of the separator form no part of the present invention, and various modifications may therefore be made in the construction and arrangement of the separating apparatus without departure from our invention.

The various running parts of the combined machine are geared in any suitable manner for conjoint action. The gearing shown in Fig. 1 will be understood without particular description, as the letters applied in other figures to the various cylinders and the concave are in this figure applied to their shafts, so as to clearly show their localities.

We claim as our invention—

1. A machine for cutting and shelling corn or cutting and shelling cereal grain in the stalk at a single operation, comprising mechanism for cutting the stalks and ears into lengths, a chute leading from the cutting mechanism concaved at its lower end and provided at said concave portion with spikes or teeth, a revolving cylinder located above said concave portion of the chute and provided with spikes or teeth, and a separator for receiving the cut material after it leaves the chute, substantially as described.

2. A machine for cutting and shelling corn or cereal grains, comprising a rotary cutting-head, a revolving cylinder armed with spikes or teeth, a chute leading downwardly from the cutter to the cylinder and provided at its lower end with a concave armed with spikes or teeth, said concave being adjustably supported adjacent to said cylinder, substantially as described.

3. A machine for cutting and shelling corn or cereal grains, comprising a rotary cutting-head, a revolving cylinder armed with spikes or teeth, a chute leading downwardly from the cutter to the cylinder and provided at its lower end with a concave armed with spikes or teeth, said concave being adjustably supported adjacent to the cylinder, and a separator arranged to receive the cut stalks and grain after they leave the cylinder and to separate the kernels of grain therefrom, substantially as described.

4. A machine for cutting and shelling corn and cereal grains, comprising a rotary cutting-head, a chute leading downwardly from the cutting mechanism and provided at its lower end with a spike-armed concave, a revolving spike-armed cylinder located above said concave, a separator for receiving the cut stalks and ears after they leave the cylinder, and an elevator interposed between said cylinder and the separator, substantially as described.

5. The herein-described machine for cutting and thrashing corn or cereal grains, comprising a cutter, a cylinder and concave located below the cutter and arranged to receive the material discharged from the cutter, a shoe provided with one or more screens, a receptacle located below the discharge of the shoe, and a fan located in advance of said receptacle and adapted to discharge an air-blast between said receptacle and the discharge of said shoe, substantially as described.

In testimony that we claim the foregoing as our invention we affix our signatures in presence of two witnesses.

PETER HOBLER.
ALBERT S. PECK.

Witnesses:
M. E. DAYTON,
C. CLARENCE POOLE.